United States Patent [19]

Kelly

[11] Patent Number: 4,895,379

[45] Date of Patent: Jan. 23, 1990

[54] CONVERTIBLE TRICYCLE/RIDING TOY

[75] Inventor: Ray G. Kelly, St. Louis, Mo.

[73] Assignee: Angeles Nursery Toys, Inc., Pacific, Mo.

[21] Appl. No.: 245,261

[22] Filed: Sep. 16, 1988

[51] Int. Cl.4 ............................................. B62K 13/06
[52] U.S. Cl. ..................................... 280/7.1; 280/282
[58] Field of Search ....................... 280/7.1, 7.11, 7.16, 280/282, 278, 287; D12/113

[56] References Cited

U.S. PATENT DOCUMENTS

| 1,379,305 | 5/1921 | Johns | 280/7.1 |
| 2,768,834 | 10/1956 | Wilson | 280/7.1 |
| 4,657,270 | 4/1987 | Allen et al. | 280/7.1 |

FOREIGN PATENT DOCUMENTS

| 370808 | 3/1939 | Italy | 280/7.1 |
| 608184 | 9/1948 | United Kingdom | 280/7.1 |

Primary Examiner—John A. Pekar
Attorney, Agent, or Firm—Paul M. Denk

[57] ABSTRACT

A convertible tricycle/riding toy which is interchangeable for use with any one of a variety of interchangeable frames having a variety of different uses is disclosed. The convertible tricycle/riding toy includes a handle bar and wheel frame with handle bars at one end and a front tricycle wheel rotatably mounted by foot pedals at the other end. The convertible tricycle/riding toy further includes spaced rear tricycle wheels mounted for rotation thereof. In order to convert the tricycle/riding toy as desired, a series of interchangeable frames having a variety of different uses are provided, each of which is separately and independently connected to the handle bar and wheel frame as well as rotatably mounts the rear wheels for operation of the convertible tricycle/riding toy.

10 Claims, 5 Drawing Sheets

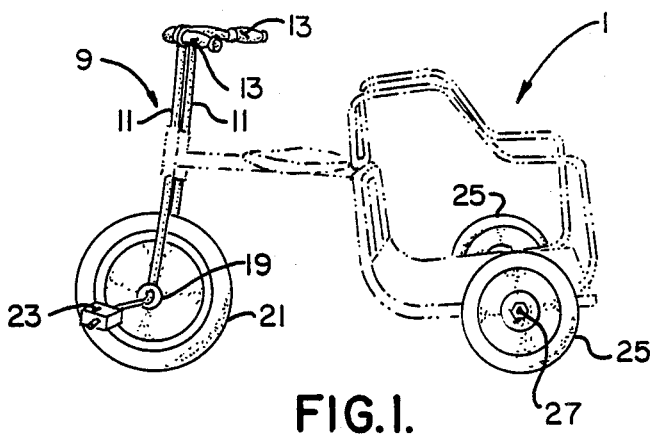
FIG. I.
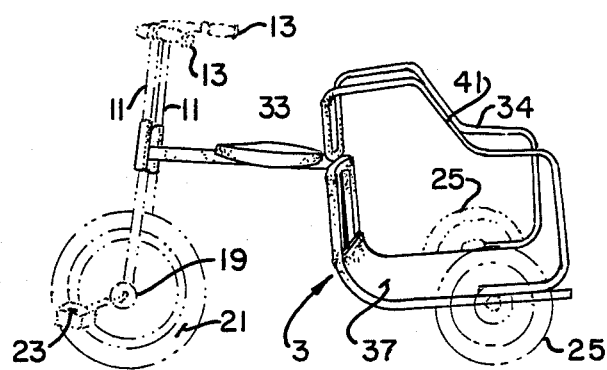
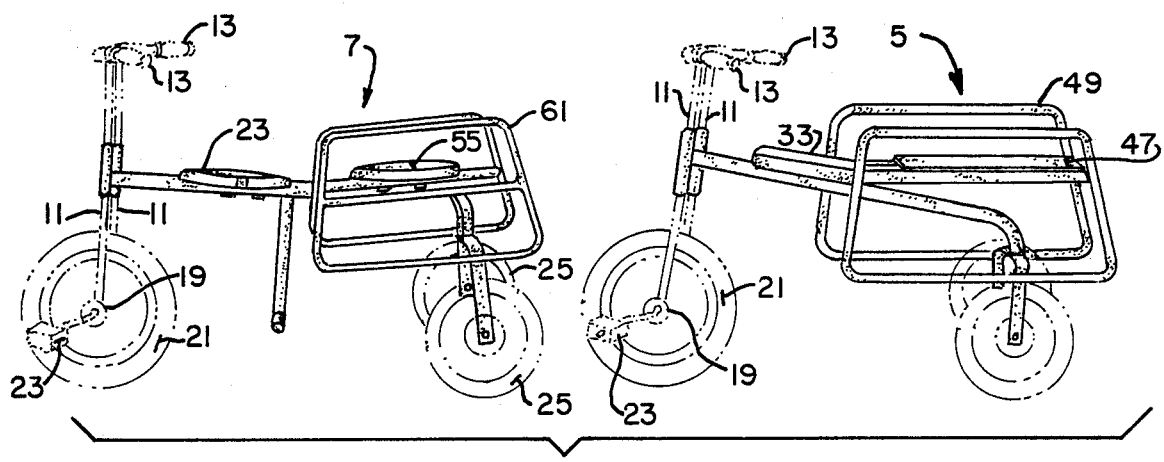
FIG. 2.

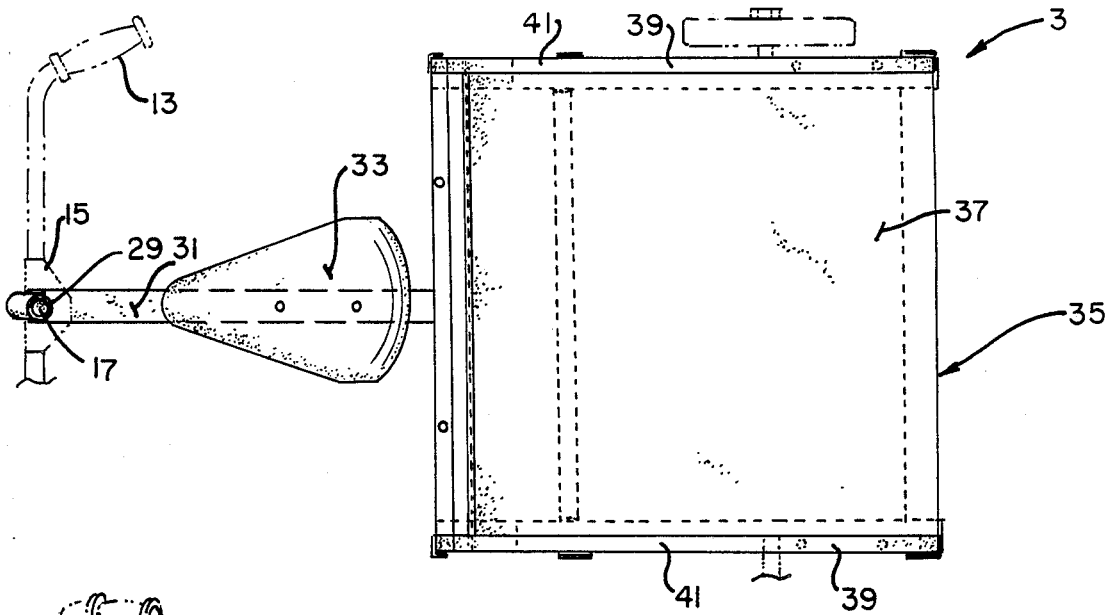
FIG. 3.
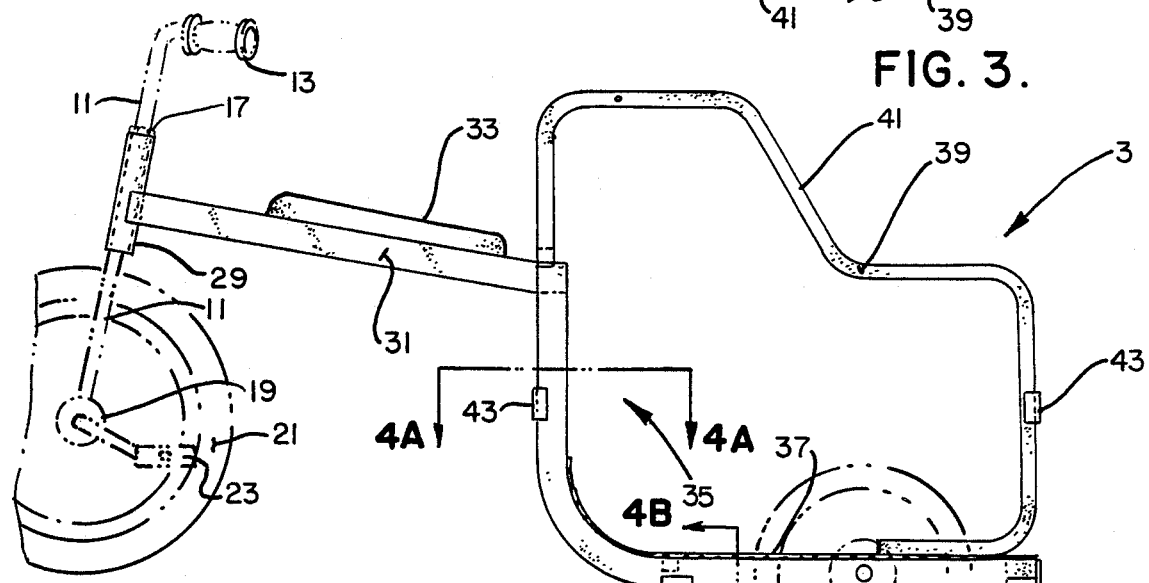
FIG. 4.
FIG. 4A.
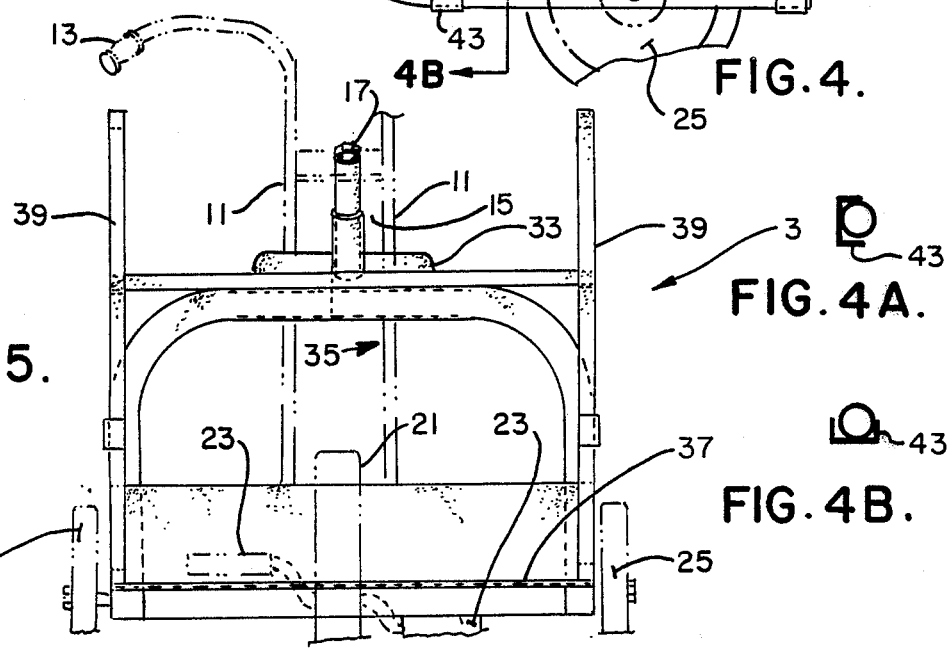
FIG. 5.
FIG. 4B.

CONVERTIBLE TRICYCLE/RIDING TOY

CROSS REFERENCE TO RELATED APPLICATION

This is a related copending application of my design patent application Ser. No. 07/131,522 filed Dec. 11, 1987 for CONVERTIBLE RIDING TOY.

BACKGROUND OF THE INVENTION

The present invention relates to a convertible tricycle/riding toy, and more particularly, to a convertible tricycle/riding toy which is interchangeable for use with any one of a variety of interchangeable frames having different uses or purposes.

Many different types and kinds of childrens tricycles and riding toys have been developed. Most of these tricycles or riding toys are single purpose units, that is, they are designed for an exclusive or single-purpose use. For example, tricycles are used primarily for a single child user who operates foot pedals, while seated, to drive a large front wheel to operate and move the tricycle. In some cases, tricycles have included a child rider support stand between the rear wheels of a tricycle enabling a second child to stand and hold on to the seated child, who operates the foot pedal to move the tricycle, as desired. In other riding toys, a seated child can operate foot pedals for moving spaced wheels contained within a fire engine, construction truck, delivery truck, or other simulated outer body shape surrounding the seated child. Other riding toys include wagons, scooters and many other wheeled vehicles.

As explained above, most of these tricycles or riding toys have been designed for use as an exclusive or single-purpose use, and, for the purpose intended, have been quite successful. At the same time, there is also a substantial market for riding toys which are convertible or interchangeable, as may be desired. As will come to be appreciated, multi-purpose tricycle or riding toys are not only enjoyed by nursery and early primary school aged children, but parents/teachers/school administrators also appreciate the flexibility and cost saving of multi-purpose units.

SUMMARY OF THE INVENTION

Among the several objects and advantages of the present invention may be noted:

the provision of a convertible tricycle/riding toy which is interchangeable for use with any one of a variety of interchangeable frames having different uses or multi-purposes;

the provision of the aforementioned convertible tricycle/riding toy which includes an interconnected cargo carrier supporting frame which is capable of being used with a common handle bar and wheel frame having a front tricycle wheel and spaced rear wheels mounted on a common shaft;

the provision of the aforementioned convertible tricycle/riding toy which may be manufactured for use as a tricycle/delivery truck or tricycle/cargo truck/chariot or tricycle/tandem cycle;

the provision of the aforementioned convertible tricycle/riding toy which includes seats for the child user and a cargo carrier platform or seat for a child rider, enabling the child rider to stand or sit, depending on the particular interchangeable frame used in the convertible tricycle/riding toy;

the provision of the aforementioned convertible tricycle/riding toy which further includes interchangeable side panels to convert the unit even further by simply removing and removably attaching different side panels to the unit, as may be desired;

the provision of the aforementioned convertible tricycle/riding toy which facilitates manufacture by using as many common parts or elements with the interchangeable frames, while providing flexibility and cost saving to the purchaser, typically the parent/teacher/school administrator; and the provision of the aforementioned convertible tricycle/riding toy which is durable, long lasting, versatile, economical, has low maintenance, and is otherwise well adapted for a variety of different purposes and uses, all of which will become apparent from the description that follows.

Briefly stated, the convertible tricycle/riding toy of the present invention is interchangeable for use with any one of a variety of interchangeable frames having different uses or purposes. Each of the interchangeable frames is separately and independently connected to a handle bar and wheel frame including generally vertically extending supporting members connected to generally horizontally extending handle bars at one end thereof and to a wheel hub at a second end thereof. A front tricycle wheel is rotatably mounted on the wheel hub and includes foot pedals connected to and rotatably driving the front tricycle wheel. Also, spaced rear tricycle wheels are provided for joint rotation thereof. The handle bar and wheel frame, together with the front tricycle wheel at one end, with the rotatably mounted rear wheels at the other end, are independently connected to any one of a series of interchangeable frames having a variety of different uses or purposes. Each interchangeable frame includes a seat for the child user enabling gripping of the handle bars and operation of the foot pedals while seated. Each of the interchangeable frames are further provided with an interconnected cargo carrier supporting frame extending behind the seat which also support the rear tricycle wheels. Interconnected cargo carrier supporting frames may include a generally horizontally extending cargo platform adjacent to and generally horizontally aligned with the seat, a generally horizontally extending lower cargo platform which is behind the seat and is generally aligned with the rear tricycle wheels, or be provided with a second seat spaced from and generally horizontally aligned with the first seat. Additionally, interconnected tubular frame side members are provided on opposite of the interconnected cargo carrier supporting frame and further may include handle grips or handle supporting bars for use by a child rider. Finally, interchangeable complementary-shaped panels are removably attached to the tubular frame side members to facilitate change thereof and additional convertibility of the convertible tricycle/riding toy.

Other and further objects and advantages will become apparent from the description that is to follow.

BRIEF DESCRIPTION OF THE DRAWINGS

FIG. 1 is an isometric view of the convertible tricycle/riding toy of the present invention showing common elements in full lines, with one of the interchangeable frames shown in dotted lines;

FIG. 2 is an isometric view illustrating three of the interchangeable frames which may be used with the convertible tricycle/riding toy of the present invention, and illustrating the common elements, shown in full lines in FIG. 1, and as phantom line representations in FIG. 2;

FIG. 3 is an enlarged top plan view of the interchangeable frame shown at the top of FIG. 2;

FIG. 4 is an enlarged side elevational view of the interchangeable frame shown in FIG. 3;

FIG. 4A is a sectional view as viewed along line 4A—4A of FIG. 4;

FIG. 4B is a sectional view as viewed along line 4B—4B of FIG. 4;

FIG. 5 is an enlarged front elevational view of the interchangeable frame shown in FIGS. 3-4;

Corresponding reference numerals will be used throughout the various figures of the drawings.

BRIEF DESCRIPTION OF THE PREFERRED EMBODIMENTS

Figure 6:
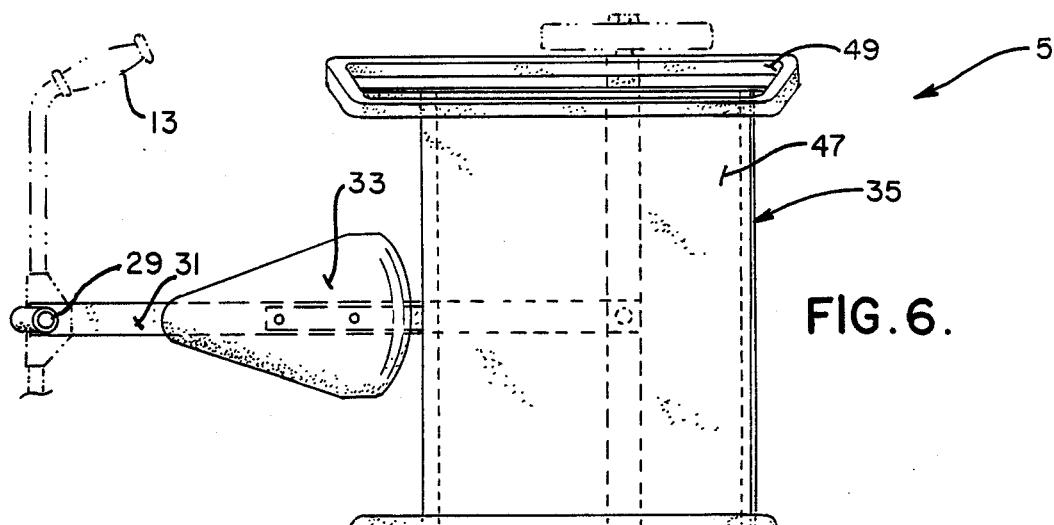
FIG. 6 is an enlarged top plan view of the interchangeable frame shown at the right side of FIG. 2.

As best seen in FIGS. 1-2 of the drawings, the convertible tricycle/riding toy of the present invention has common elements shown in full lines in FIG. 1 of the drawings which may be used with any one of the series of interchangeable frames shown in FIG. 2 of the drawings. In particular, the convertible tricycle/riding toy 1 of the present invention may be used with any one of the interchangeable frames 3, 5 or 7 shown in FIG. 2 of the drawings. Interchangeable frame 3 enables the convertible tricycle/riding toy to be used as a tricycle/cargo truck/chariot-type carrier, as will become apparent. The interchangeable frame 5 enables the convertible tricycle/riding toy to be used as a tricycle/delivery truck, whereas the interchangeable frame 7 enables the convertible tricycle/riding toy 1 to be used as a tricycle/tandem cycle, all of which will become more apparent in the ensuing description.

For use with any one of the series of interchangeable frames 3, 5, 7 the convertible tricycle/riding toy 1 of the present invention has common elements or components including a handle bar and wheel frame 9 illustrated in full lines in FIG. 1 of the drawing as including generally vertically extending supporting tubular members 11, 11 connected to generally horizontally extending handle bars 13, 13 at one end thereof. The vertically extending tubular supporting members 11, 11 are interconnected by a web 15 extending therebetween (see FIG. 5) which is constructed to receive a pivot pin 17 for pivotally mounting the handle bar and wheel frame 9 to the interchangeable frame 3, as will be described. The generally vertically extending tubular supporting members 11, 11 may be separated both above and below the interchangeable frame 3 or may be combined into a singular tubular unit (not shown) above the interchangeable frame 3, as is well known. By having the generally vertically extending tubular supporting members 11, 11 separated from one another below the interchangeable frame 3, the supporting members 11, 11 are then capable of being mounted to a wheel hub 19, for rotatably supporting the front tricycle wheel 21 thereon. The pedals 23, 23, on opposite sides of the front tricycle wheel 21, are connected to the front tricycle wheel 21 for rotatably driving same. As shown in the drawings, the foot pedals 23, 23 are shown as being interconnected to one another through the wheel hub 19, but other variations of foot pedal/front tricycle wheel driving engagement relative to the wheel hub may be provided, as will be apparent.

In addition to the front tricycle wheel 21, spaced rear tricycle wheels 25, 25 are mounted on short axles 27, 27 to the interchangeable frames for rotation thereof. Alternatively, the tricycle wheels 25, 25 could be mounted on a common shaft supported by the interchangeable frames. Together with the handle bar and wheel frame 9 having the front tricycle wheel 21 with associated foot pedals 23, 23, the spaced rear tricycle wheels 25, 25, rotatably mounted by the short axles 27, 27, are used as the common elements or components in the convertible tricycle/riding toy 1 of the present invention.

The construction of the interchangeable frame 3 in the manner, when used with the common elements or components above described, provide one form of the convertible tricycle/riding toy of the present invention as will best be understood by referring to FIGS 1-5 and 12 of the drawings. The interchangeable frame 3 includes a pivotal tubular support 29 for receiving the pivot pin 17, associated with the interconnected web 15 of the vertically extending tubular supporting members 11, 11, in order to pivotally mount the interchangeable frame 3 relative to the handle bar and wheel frame 9. Extending rearwardly of the pivotal support 29 is a generally horizontally extending tubular element 31 upon which a seat 33 is mounted to enable the child user of the convertible tricycle/riding toy 1 to grip the handle bars 13, 13 and operate the foot pedals 23, 23 while seated on the seat 33. It will be noted that the seat 33 is positioned generally intermediate the front and rear tricycle wheels 21 and 25, 25 respectively.

Extending behind the seat 33 and supported by the short axle shafts 27, 27 of the rear tricycle wheels 25, 25 is an interconnected cargo carrier supporting frame 35 which is interconnected to the generally horizontally extending tubular member 31. In the interchangeable frame 3, the interconnected cargo carrier supporting frame 35 includes a generally horizontally extending lower cargo platform 37 which is generally aligned with the rear tricycle wheels 25, 25, and is interconnected to the tubular frame side members 39, 39 which extend above the seat, as best shown in FIGS. 4-5 of the drawings. The angular portion 41 of each tubular frame side member 39 extends above the seat 33 to enable a child rider to stand on the lower cargo platform 37 while gripping the spaced gripping bars or portions 41.

Figure 10:
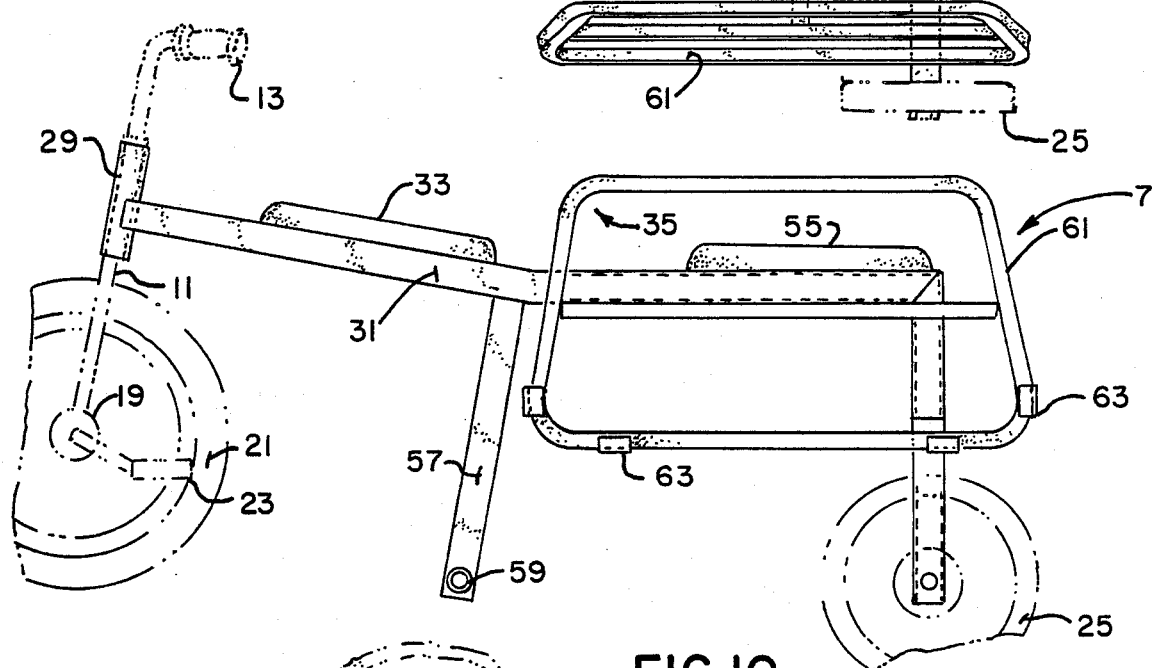
FIG. 10 is an enlarged side elevational view of the interchangeable frame illustrated in FIG. 9.
Figure 11:
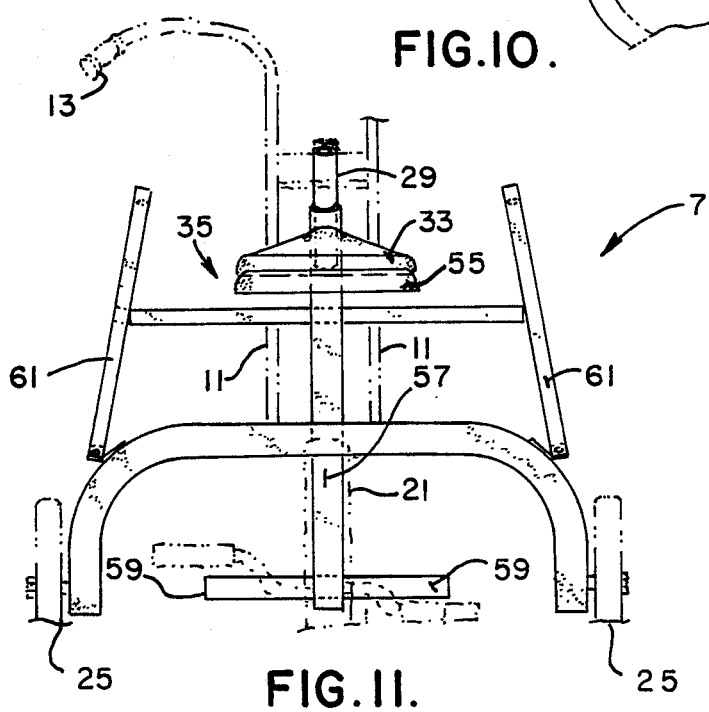
FIG. 11 is an enlarged front elevational view of the interchangeable frame shown in FIGS. 9-10.

As best seen in FIGS. 4, 4A, 4B of the drawings, each of the tubular frame side members 39 have a series of spaced open-sided clips 43 circumferentially or peripherally spaced therearound for receiving an interchangeable complementary-shaped panel 45 which is removably attached to each of the tubular frame side members 39, 39. As seen in FIGS. 4A and 4B, the clips 43 each have a finger or leg that is spaced from an associated tubular members of the supporting frame 35 to slidably and releasably receive interchangeable panels 45, (see FIG. 10). Each of the panels 45 have a cut out (see FIG. 12) to enable the bars or portions 41 thereof to continue to serve as gripping bars for a child rider standing on the lower cargo platform 37.

Figure 12:
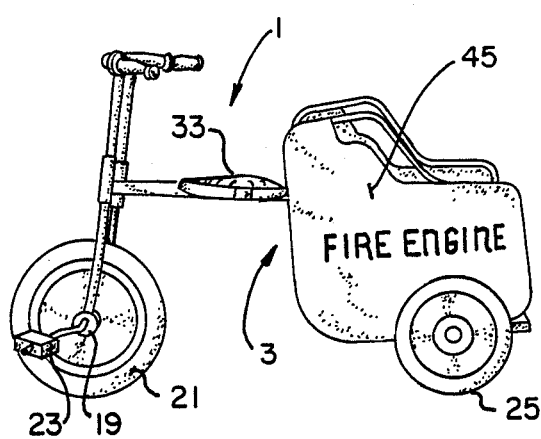
FIG. 12 is an isometric view of a fully assembled convertible tricycle/riding toy utilizing the interchangeable of FIGS. 3-5 of the drawings.

Using the convertible tricycle/riding toy 1 with the interchangeable frame 3, it will be seen that the child user, seated on the seat 33 for operation of the foot pedals 23, 23, may utilize the interchangeable frame 3 either as a cargo truck or as a chariot type carrier for a child rider. With panels 45 mounted to the tubular side frame members 39 by the peripherally spaced clips 43, the child user may utilize the interchangeable frame 3 as a cargo truck for carrying a child of nursery/primary school age. Even with the panels 45 mounted to the tubular side frame members 39, 39 as shown in FIG. 12 of the drawings, a convertible tricycle/riding toy 1 with the interchangeable frame 3 enables a child rider to stand on the lower cargo platform 37 while gripping the spaced handle or gripping bars 41, 41 associated with the spaced tubular frame side members 39, 39.

Figure 7:
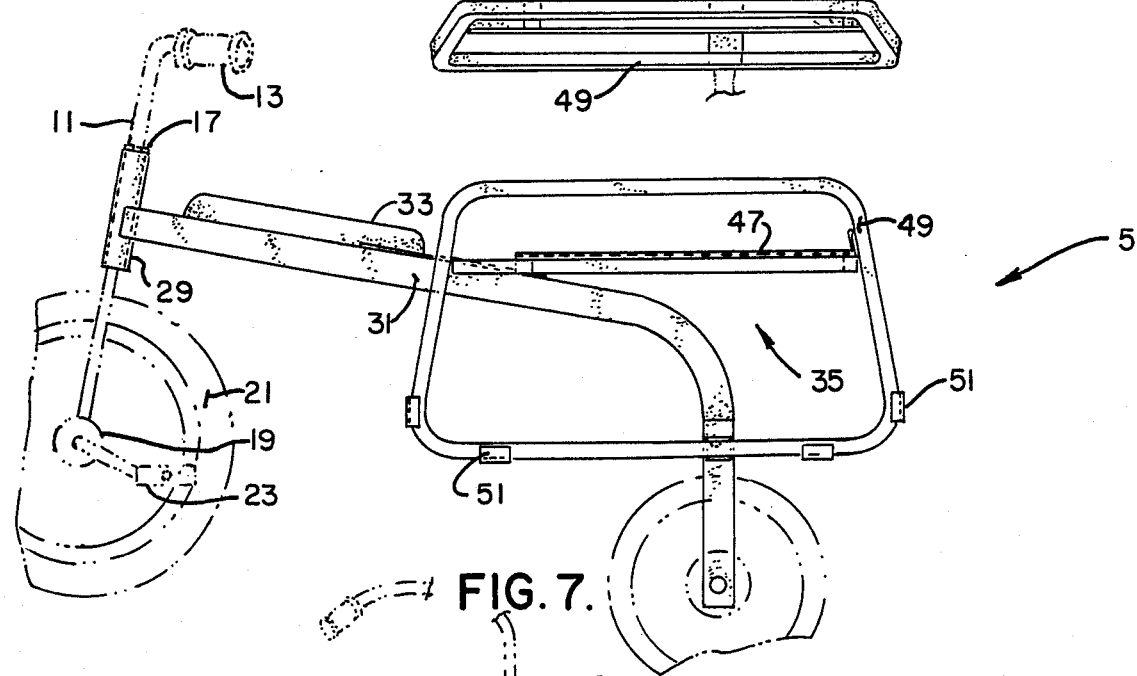
FIG. 7 is an enlarged side elevational view of the interchangeable frame illustrated in FIG. 6.
Figure 8:
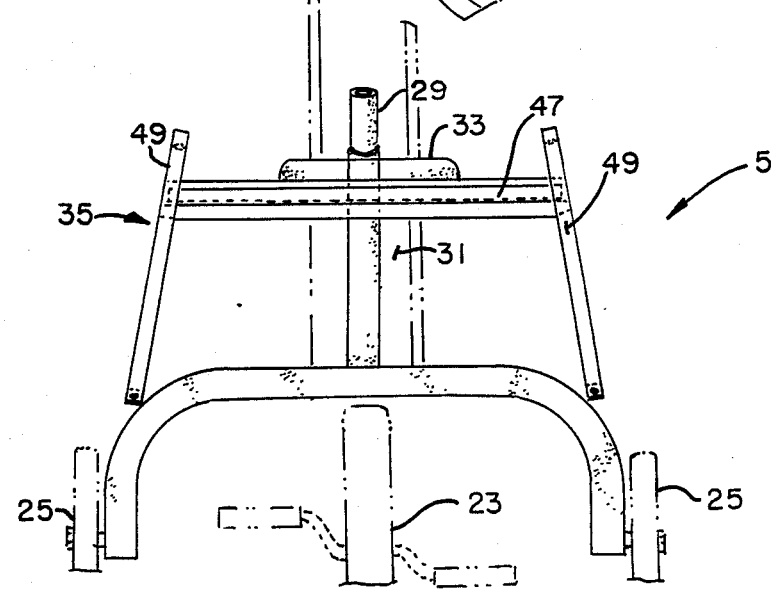
FIG. 8 is an enlarged front elevational view of the interchangeable frame shown in FIGS. 6-7.
Figure 9:
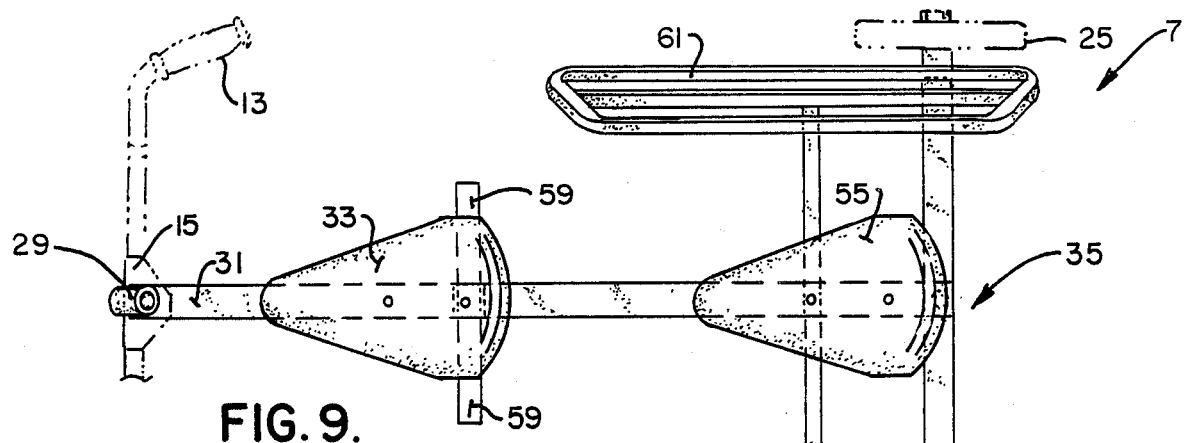
FIG. 9 is an enlarged top plan view of the interchangeable frame shown at the left hand side of FIG. 2.
Figure 13:
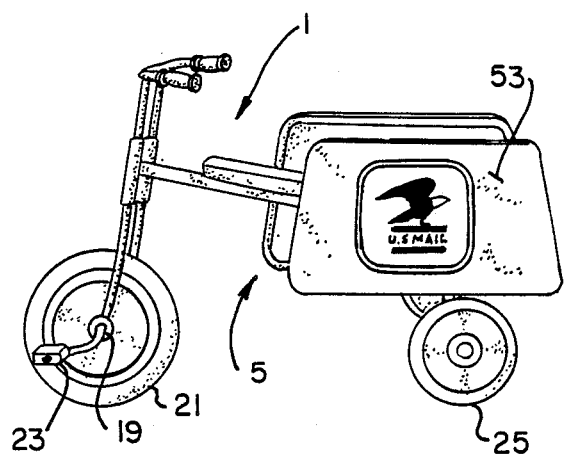
FIG. 13 is an isometric view of the fully assembled convertible tricycle/riding toy utilizing the interchangeable frame of FIGS. 6-8 of the drawings.
Figure 14:
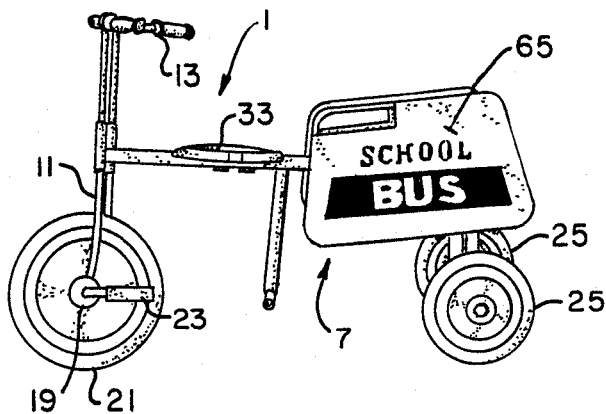
FIG. 14 is an isometric view of a fully assembled convertible tricycle/riding toy utilizing the interchangeable frame illustrated in FIGS. 9-11 of the drawings.
Figure 15:
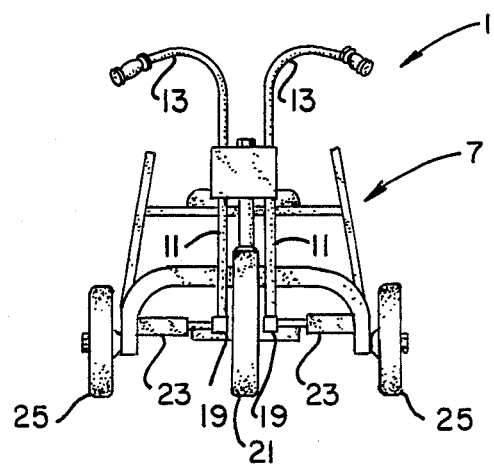
FIG. 15 is a front elevational view of the fully assembled convertible tricycle/riding toy illustrated in FIG. 14 of the drawings.

Reference is now made to FIGS. 1-2, 6-8, and 13 for a description of the construction and use of the interchangeable frame 5 in the convertible tricycle/riding toy 1 of the present invention. As seen in FIGS. 6-8, the horizontally extending tubular supporting bar 31 underlies the seat 33 which again is positioned intermediate the front tricycle wheel 23 and the rear tricycle wheels 25, 25. The interconnected cargo carrier supporting frame 35, of the interchangeable frame 5, includes a generally horizontally extending cargo platform 47 that is rearwardly adjacent to the seat 33 and is generally horizontally aligned therewith. Generally polygonally shaped tubular side frame members 49, 49 extend both above and below the generally horizontally extending cargo platform 47 as illustrated in FIG. 7-8 for attaching an interchangeable complementary shaped panel through the tubular side frame members 49, 49. A series of spaced peripherally extending clips 51 are provided for removably attaching the interchangeable panel 53, as best seen in FIG. 13 of the drawings. Again, the interchangeable panel 53 may have various colored and printed or painted information thereon to identify the vehicle as a delivery truck or the like.

Reference is now made to the convertible tricycle/riding toy 1, utilizing the interchangeable frame 7, best shown in FIGS. 2, 9-11 and 14 of the drawings. In this interchangeable frame construction, the interconnected cargo carrier supporting frame 35 further includes a second seat 55 spaced from and generally horizontally aligned with the first seat 33 and supported by an extension of the tubular rod 31, as will be seen. Utilizing a second seat 55, the convertible tricycle/riding toy 1 becomes a tricycle/tandem cycle, as will be appreciated. The rod extension 57 depends from the tubular rod 31 and includes fixed foot supporting pads 59, 59 spaced forward of and below the second seat 55 for supporting the feet and legs of a child rider, above a floor surface, when seated on the second seat 55, as will be apparent.

The interconnected cargo carrier supporting frame 35 further includes interconnected polygonally shaped tubular side frame members 61, 61 on opposite sides of the second seat 55 which are constructed figured similar to the side frame members 49, 49 in the interchangeable frame 5. Peripherally spaced clips 63 are also mounted on the tubular side frame members 61, 61 to mount the interchangeable panel 65 thereon, as shown FIG. 14 of the drawings. Interchangeable panel 65 contains identifying indicia for various uses or purposes of the convertible tricycle/riding toy 1, when used with the interchangeable frame 7, as will be understood.

From the foregoing, it will be appreciated that the convertible tricycle/riding toy of the present invention may be interchangeably used with any one of a variety of interchangeable frames having different uses and purposes as may be desired. With the interchangeable frame 3, the convertible tricycle/riding toy 1 may be used as a tricycle or cargo truck or chariot-type vehicle for accommodating a child rider along with the child user. With the interchangeable frame 5 in the convertible tricycle/riding toy 1 of the present invention, the child user may utilize the vehicle as any one of a number of delivery trucks, depending on the identifying indicia on the interchangeable panels used in the interchangeable frame 5. When the interchangeable frame 7 is utilized in the convertible tricycle/riding toy 1 of the present invention, the unit may be used as a tricycle and tandem cycle for both a child user and child rider. Other different types and constructions of interchangeable frames utilizing the interconnected cargo carrier supporting frame with different features and constructions are also within the purview of the present invention.

In addition the convertible tricycle/riding toy of the present invention utilizes interchangeable complementary shaped panels removably attached to tubular frame side members of the supporting frame. The interchangeable panels can be mounted by means other than clips, i.e., screws or velcro fasteners or slide in channels.

In view of the above it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A convertible tricycle/riding toy interchangeable for use with any one of a variety of interchangeable frames, comprising, a handle bar and wheel frame including generally at least one vertically extending supporting member connected to generally horizontally extending handle bars at one end thereof and to a wheel hub at a second end thereof, a front tricycle wheel rotatably mounted on said wheel hub, and including foot pedals connected to and rotatably driving said front tricycle wheel, spaced rear tricycle wheels mounted for rotation thereof, and any one of a series of interchangeable frames for a variety of different uses each being separately and independently connected to said handle bar and wheel frame and rotatably mounting said rear wheels for operation of said convertible tricycle/riding toy, said interchangeable frames including a pivotal support for pivotally mounting the generally vertical handle bar supporting members of said handle bar and wheel frame, and a shaft support for the common shaft of said spaced rear wheels for free rotatable movement thereof, each interchangeable frame including a seat for the child user enabling gripping of the handle bars and operation of the foot pedals while seated, said seat being positioned intermediate the front and rear tricycle wheels on said interchangeable frames and each of said interchangeable frames further being provided with an interconnected cargo carrier supporting frame extending behind said seat and supported by the common shaft of said rear tricycle wheels, and said interconnected cargo carrier supporting frame of one of said interchangeable frames including a generally horizontally extending lower cargo platform behind said seat and being generally aligned with said tricycle wheels, and fixed spaced gripping bars extending above said seat on opposite sides of said cargo platform to enable a child rider to stand on said lower cargo platform while gripping said fixed spaced gripping bars.

2. The convertible tricycle/riding toy as defined in claim 1 wherein said interconnected cargo carrier supporting frame further includes interconnected tubular frame side members extending above said seat and also being connected to said lower cargo platform, interchangeable complementary-shaped panels removably attached to each of said tubular frame side members, and said fixed spaced gripping bars including part of said tubular frame side members on opposite sides of said lower cargo platform.

3. The convertible tricycle/riding toy as defined in claim 1 wherein each of said side frame members comprises a polygonally shaped tubular frame extending both above and below said generally horizontally extending cargo platform and interchangeable complementary-shaped panels removably attached to each of said polygonally shaped tubular frames.

4. A convertible tricycle/riding toy interchangeable for use with any one of a variety of interchangeable frames, comprising, a handle bar and wheel frame including generally at least one vertically extending supporting member connected to generally horizontally extending handle bars at one end thereof and to a wheel hub at a second end thereof, a front tricycle wheel rotatably mounted on said wheel hub and including the foot pedals connected to and rotatably driving said front tricycle wheel, spaced rear tricycle wheels mounted for rotation thereof, any one of a series of interchangeable frames for a variety of different uses each being separately and independently connected to said handle bar and wheel frame and rotatably mounting said rear wheels for operation of said convertible tricycle/riding toy, each of said interchangeable frames including a pivotal support for pivotally mounting the generally vertical handle bar supporting members of said handle bar and wheel frame, and a shaft support for the common shaft of said spaced rear wheels for free rotatable movement thereof, each of said interchangeable frames including a seat for the child user enabling gripping of the handle bars and operation of the foot pedals while seated, said seat being positioned intermediate the front and rear tricycle wheels on said interchangeable frames and each of said interchangeable frames further being provided with an interconnected cargo carrier supporting frame extending behind said seat and supported by the common shaft of said rear tricycle wheels, the interconnected cargo carrier supporting frame of one of said interchangeable frames including a generally horizontally extending cargo platform rearwardly adjacent to said seat and generally horizontally aligned therewith, and side frame members attached to said generally horizontally extending cargo platform on opposite sides thereof and extending at least above said cargo platform to limit movement of cargo carried on said cargo platform.

5. The convertible tricycle/riding toy as defined in claim 4 wherein said interconnected cargo carrier supporting frame further includes interconnected polygonally shaped tubular side frame members on opposite sides of said second seat, interchangeable complementary-shaped panels removably attached to each of said polygonally shaped tubular frames, and said handle grips including part of said tubular frame side members on opposite sides of said second seat.

6. A convertible tricycle/riding toy interchangeable for use with any one of a variety of interchangeable frames, comprising, a handle bar and wheel frame including generally at least one vertically extending supporting member connected to generally horizontally extending handle bars at one end thereof and a wheel hub at a second end thereof, a front wheel rotatably mounted on said wheel hub and including foot pedals connected to and rotatably driving said front tricycle wheel, spaced rear tricycle wheels mounted for rotation thereof, and any one of a series of interchangeable frames for a variety of different uses, each being separately and independently connected to said handle bar and wheel frame and rotatably mounting said rear wheels for operation of said convertible tricycle/riding toy, each of said interchangeable frames including a pivotal support for pivotally mounting the generally vertical handle bar supporting members of said handle bar and wheel frame, and a shaft support for the common shaft of said spaced rear wheels for free rotatable movement thereof, each of said interchangeable frames including a seat for the child user enabling gripping of the handle bars and operation of the foot pedals while seated, said seat being positioned intermediate the front and rear tricycle wheels on said interchangeable frames, and each of said interchangeable frames further being provided with an interconnected cargo carrier supporting frame extending behind said seat and supported by the common shaft of said rear tricycle wheels, the interconnected cargo carrier supporting frame of one of said interchangeable frames including a second seat spaced from and generally horizontally aligned with said first seat, fixed foot supporting pads spaced forward of and below said second seat for supporting the feet and legs of a child rider above a floor surface when seated on said second seat, and handle grips enabling gripping thereof by a child rider when seated on said second seat.

7. In a convertible tricycle/riding toy including a handle bar and wheel frame having generally vertically extending supporting members connected to generally horizontally extending handle bars at one end thereof and to a wheel hub at a second end thereof, a front tricycle wheel rotatably mounted on said wheel hub and including foot pedals connected to and rotatably driving said front tricycle wheel, and spaced rear tricycle wheels mounted for rotation thereof, the improvement comprising, any one of a series of interchangeable frames for a variety of different uses, each being separately and independently connected to said handle bar and wheel frame and rotatably mounting said rear wheels for operation of said convertible tricycle/riding toy, each of said interchangeable frames including a seat for the child user enabling gripping of the handle bars and operation of the foot pedals while seated, said seat being positioned intermediate the front and rear tricycle wheels, and each of said interchangeable tricycle frames further being provided with an interconnected cargo carrier supporting frame extending behind said seat and supported by the common shaft of said rear tricycle wheels, the interconnected cargo carrier supporting frame of one of said interchangeable frames including a generally horizontally extending cargo platform adjacent to said seat and generally horizontally aligned therewith, polygonally shaped tubular frame side members attached to and extending both above and below said generally horizontally extending cargo platform, and interchangeable complementary shaped panels removably attached to each of said polygonally shaped tubular frame side members.

8. In a convertible tricycle/riding toy including a handle bar and wheel frame having generally vertically extending supporting members connected to generally horizontally extending handle bars at one end thereof, and to a wheel hub at a second end thereof, a front tricycle wheel rotatably mounted on said wheel hub and including foot pedals connected to and rotatably driving said front tricycle wheel, and spaced rear tricycle wheels mounted for rotation thereof, the improvement comprising, any one of a series of interchangeable frames for a variety of different uses, each being separately and independently connected to said handle bar and wheel frame and rotatably mounting said rear wheels for operation of said convertible tricycle/riding toy, each of said interchangeable frames including a seat for the child user enable gripping of the handle bars and operation of the foot pedals while seated, said seat being positioned intermediate the front and wheel tricycle wheels, and each of said interchangeable tricycle frames further being provided with an interconnected cargo carrier supporting frame extending behind said seat and supported by the common shaft of said rear tricycle wheels, the interconnected cargo supporting frame of one of said interchangeable frames including a second seat spaced from and generally horizontally aligned with said first seat, fixed foot supporting pads spaced forward of and below said second for supporting the feet and legs of a child rider above a floor surface when seated on said second seat, polygonally shaped tubular frame side members on opposite sides of an extending both above and below said second seat, said interconnected tubular frame side members also providing handle grips extending above said seat enabling gripping by a child rider when seated on said second seat, and interchangeable complementary-shaped panels removably attached to each of said tubular frame side members.

9. In a convertible tricycle/riding toy including a handle bar and wheel frame having generally vertically extending supporting members connected to generally horizontally extending handle bars at one end thereof and to a wheel hub at a second end thereof, a front tricycle wheel rotatably mounted on said wheel hub and including foot pedals connected to and rotatably driving said front tricycle wheel, and spaced rear tricycle wheels mounted for rotation thereof, all of said foregoing elements being mounted to an interconnected tubular frame, the improvement comprising, any one of a series of interchangeable complementary shaped panels removably attached to said interconnected tubular frame, said interchangeable complementary shaped panels being removably attached to said interconnected tubular frame by clips spaced along said frame, said interchangeable complementary shaped panels being slidably and removably attached to said interconnected tubular frame by open-sided clips.

10. The improvement as defined in claim 9 wherein said interchangeable complementary shaped panels are mounted on opposite sides of said interconnected tubular frame by said clips.

* * * * *

UNITED STATES PATENT AND TRADEMARK OFFICE
CERTIFICATE OF CORRECTION

PATENT NO. : 4,895,379
DATED : January 23, 1990
INVENTOR(S) : Ray G. Kelly

It is certified that error appears in the above—identified patent and that said Letters Patent is hereby corrected as shown below:

Claim 8, column 10, line 5, after "second" and before "for", insert ---seat---.

Signed and Sealed this

Eighteenth Day of December, 1990

*Attest:*

HARRY F. MANBECK, JR.

*Attesting Officer*      *Commissioner of Patents and Trademarks*